United States Patent [19]

Masuda

[11] 4,079,748
[45] Mar. 21, 1978

[54] AUTOMATIC STOP VALVE

[75] Inventor: Eiji Masuda, Minoo, Japan
[73] Assignee: Masuda Co., Ltd., Ibaragi, Japan
[21] Appl. No.: 670,562
[22] Filed: Mar. 25, 1976
[51] Int. Cl. .......................... F16k 31/22; F16k 31/524
[52] U.S. Cl. ...................................... 137/410; 137/432;
137/433; 251/251; 4/366; 4/324
[58] Field of Search ............... 4/41, 57 P, 67 A, 67 R;
137/410, 429, 430, 432, 433, 446; 251/347, 251

[56] References Cited

U.S. PATENT DOCUMENTS

| | | | |
|---|---|---|---|
| 571,168 | 11/1896 | Mott, Jr. | 137/446 |
| 578,803 | 3/1897 | Wood | 137/410 |
| 1,217,183 | 2/1917 | Jackson | 137/410 |
| 2,367,951 | 1/1945 | Lewis et al. | 137/446 |
| 2,549,198 | 4/1951 | Hayward | 251/347 |
| 2,795,237 | 6/1957 | Corbin | 137/433 |
| 2,854,023 | 9/1958 | Heyer | 137/432 |
| 2,867,820 | 1/1959 | Gray | 4/41 |
| 3,044,482 | 7/1962 | Golden | 137/433 |
| 3,110,036 | 11/1963 | Downin | 137/446 |
| 3,140,641 | 7/1964 | Clarke et al. | 137/433 |
| 3,171,424 | 3/1965 | Shames et al. | 137/410 |
| 3,282,288 | 11/1966 | Sheppard | 137/430 |
| 3,351,083 | 11/1967 | Sait | 137/433 |
| 3,374,802 | 3/1968 | Egleston | 137/432 |
| 3,865,131 | 2/1975 | Jacobson | 137/432 |

*Primary Examiner*—Martin P. Schwadron
*Assistant Examiner*—G. L. Walton
*Attorney, Agent, or Firm*—Haseltine, Lake & Waters

[57] ABSTRACT

An automatic stop valve mounted in a liquid supply port of a container to be supplied with pressurized liquid, which valve ensures that liquid supply is automatically and instantaneously stopped when the liquid surface reaches a predetermined level. The valve comprises a hollow valve body with at least one liquid supply port formed at one end and one or more liquid discharge ports formed in the vicinity of the other end, a valve cylinder loosely engaged with the valve body and adapted to be movable axially of the valve body as the level of the pressurized liquid supplied into the container rises and a valve release mechanism for opening the valve by pressing the valve cylinder downwardly. The valve body has a pair of axially spaced seal members secured on the periphery of the valve body with the liquid discharge ports positioned between the seal members, and wherein the valve cylinder may contact the seal members liquid-tightly at both axial ends when the liquid level reaches a predetermined level.

9 Claims, 8 Drawing Figures

(a)

(b)

(a)

(b)

AUTOMATIC STOP VALVE

FIELD OF THE INVENTION

This invention relates to an automatic stop valve adapted for automatically stopping the supply of pressurized liquid when the liquid level reaches a certain predetermined level.

BACKGROUND

Several proposals have been made on valve devices of the type capable of automatically stopping the liquid supply when the surface of pressurized liquid supplied to a container has reached a predetermined level. However, all of these proposed valve devices are complicated and not compact in structure and also the valve operation is rather sluggish and not certain. The conventional stop valves of this type, therefore, are weak in liquid blocking force and slow in the stopping operation, thus requiring much time until a perfect stoppge of liquid supply is attained. For instance, in the known automatic constant-level water supply system for water tanks, an operating lever for opening and closing the water discharge valve device at the tank bottom is provided on the tank wall and a ball tap for connecting or disconnecting the water supply pipe and a flooding pipe is provided on a side of the water discharge valve unit in the tank, so that this system has, besides the above-mentioned operational defects, the problem that it is costly to manufacture and vulnerable to trouble owing to the complicated structure of the ball tap. Also, the use of such ball tap necessitates enlargement of the tank size.

SUMMARY OF THE INVENTION

The present invention has for its object to provide a stop valve of the type described which is free of the said problems of the similar devices of the prior art.

According to the present invention, there is provided a valve for automatically stopping pressurized liquid supply when the liquid level reaches a preset level, comprising a valve body mounted in the liquid supply port of a liquid container and having at one end at least one pressurized liquid supply port and close to its other end one or more liquid discharge ports, a pair of seal members being provided on the periphery of said valve body and axially spaced from each other, and a valve cylinder loosely engaged with said valve body and adapted to be movable axially of the valve body in accordance with rise of the level of the pressurized liquid supplied into the container, and wherein the liquid discharge ports of said valve body are formed between said pair of seal members so that both axial ends of said valve cylinder may contact closely and liquid-tightly with said seal members when the liquid level reaches the predetermined level.

With the above-described construction, the stop valve of the present invention can quickly and securely stop the liquid supply with a strong blocking force provided by making use of the pressurized liquid alone, and also the entire structure of the valve is extremely simple. Thus, the stop valve according to the present invention can be used for a wide variety of purposes, and it finds particular application in, for example, fuel tank for automobiles or water tank for flush toilets.

BRIEF DESCRIPTION OF THE DRAWING

Now the present invention will be described in detail in relation to preferred embodiments with reference to the accompanying drawings. In the drawings.

DETAILED DESCRIPTION

Figure 1:
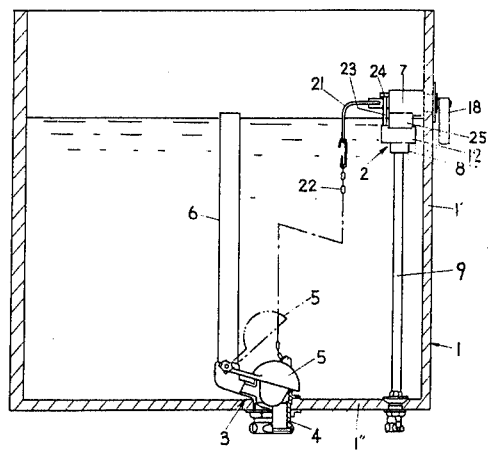
FIG. 1 is a schematic sectional view, with parts cut away, of a water tank in which the automatic liquid supply stop valve in accordance with the present invention is employed.
Figure 2:
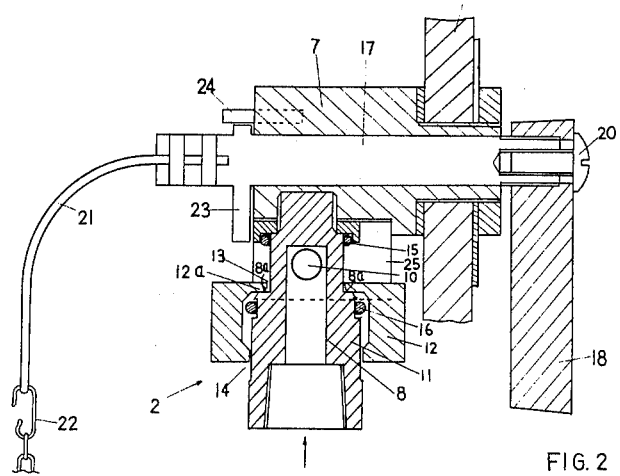
FIG. 2 shows enlarged views of the water supply portion of said water tank, with (a) showing a front sectional view and (b) showing an elevational sectional view.
Figure 2:
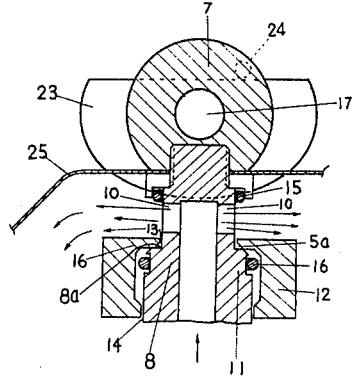

Referring first to FIG. 1, there is shown a water tank 1 made of a material such as porcelain and provided with the valve 2 of the present invention. Substantially at the center of the tank bottom 1" there is provided a water discharge valve assembly, generally designated by numeral 3, including a water discharge pipe 4 which is connected to a toilet bowl, for example. The discharge valve 5 of said water discharge valve assembly 3 is made of an elastic material, such as rubber, and has a proximal portion pivotally joined to a lower part of an overflow pipe 6 which connects into said discharge valve assembly 3. A sleeve 7 is passed through an upper part of the side wall 1' of the tank 1, said sleeve 7 having fitted thereto a cylindrical valve body 8 which is connected to a water supply pipe 9 inserted upwardly from the tank bottom 1" as shown. It will be also noted that one or more water supply ports 10 are formed in the side wall of the intermediate stepped portion or shoulder 8a of said valve body 8, with the lower end of said valve body 8 terminating in a larger diameter retainer portion 11 around which is loosely mounted a valve cylinder 12 having a small specific gravity and floatable in water, said valve cylinder 12 being formed at its top with an opening 13 smaller in diameter than another opening 14 formed at the bottom of valve cylinder 12 as shown. The valve cylinder 12 is preferably made of a synthetic resin such as polypropylene, but in case it is hollowed internally, it may be made of a metal. There are also provided ring-shaped packings 15 and 16 which are so adapted that they will close the top opening 13 and bottom opening 14, respectively, in said valve cylinder 12 when the latter has moved to the extreme upward position, whereby the water supply ports 10 are sealed off in valve cylinder 12 (see FIG. 3). Extending through sleeve 7 is a revolvable shaft 17, and an operating lever 18 is fixed by a screw or like means 20 to the outer end of shaft 17 which extends outside of the tank wall 1'. Secured to the inner end of said shaft 17 within the tank 1 is an arm 21 which extends perpendicularly to the operating lever 18 and is bent downwardly at its other end and joined to an end of a chain 22 whose other end is connected to the discharge valve 5 of the water discharge valve assembly 3. Also mounted around a part of the shaft 17 positioned inside of the tank 1 is a swingable half-circular cam element 23 disposed perpendicular to shaft 17. When the cam element 23 is swung so as to abut against a stopper pin 24 provided at an end of the sleeve 7, the valve cylinder 12 is pushed down by the cam element 23. Numeral 25 designates a hood or cap member adapted to prevent scattering of water suplied from the water supply ports 10.

Figure 3:
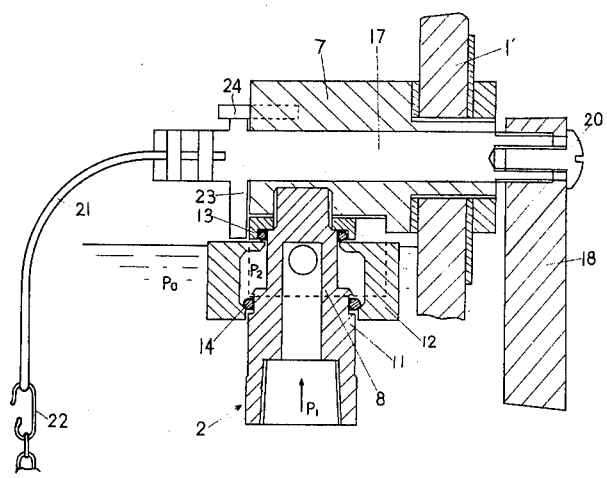
FIG. 3 is similar to FIG. 2 but showing the valve in a closed condition.
Figure 3:
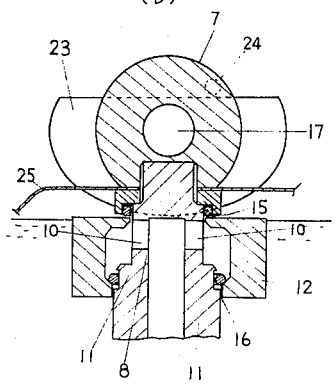

The above-described valve of the present invention operates as follows. If the operating lever 18 is turned 90° when the water level in the tank 1 is low, the valve cylinder 12 is pushed down by the cam element 23, allowing supply of water into the tank 1 from the water supply ports 10. Then, if the operating lever 18 is released, it returns to its original position owing to eccentricity of the cam element 23 and the weight of the operating lever 18, closing the water discharge valve 5 of the valve assembly 3. When the water level rises to a certain set level due to supply of water from water supply ports 10, the valve cylinder 12 is forced up by the buoyant force of the water and water enters the valve cylinder 12 through its tapered opening 12a, causing the valve cylinder 12 to float up further. In other words, the valve cylinder 12 is pushed up to the position shown in FIGS. 3(a) and 3 (b) by a force equivalent to the product of the areal difference $\pi(D_1^2 - d_1^2)/4$ between the top opening diameter $d_1$ and bottom opening diameter $D_1$ ($d_1 < D_1$) of the valve cylinder 12 and the internal and external pressure difference ($P_2 - P_0$) in said cylinder 12 where $P_0$ and $P_2$ are the liquid pressure outside and inside the valve cylinder, respectively is indicated in FIG. 3 (a). Thus, as soon as the top end face of the valve cylinder 12 contacts the cam element 23 to seal said cylinder 12 with packings 15 and 16 as shown in FIGS. 3 (a) and (b), the internal pressure increases to the pressure $P_1$ of the supplied liquid, causing the valve cylinder 12 to be pushed up by a force equal to the product of the pressure-loaded areal difference $\pi(D_2^2 - d_2^2)/4$ between said packings 15 and 16 ($d_2$ is the diameter of the packing 15 and $D_2$ is the diameter of the packing 16) and the internal and external pressure difference ($P_1 - P_0$) of the valve cylinder 12, whereby the upper parts of said valve cylinder 12 is perfectly sealed by the packing 15 while the lower part of said cylinder is perfectly sealed by the packing 16. During this operation, no throttling action of the water supply valve, such as in a ball tap, is performed, thereby providing quick stoppage of the water supply. Also even if the water level, under this condition, lowers from the prescribed level, no descent of the valve cylinder 12 is produced due to the pressure-loaded areal difference. Overflow water is discharged through overflow pipe 6.

Figure 4:
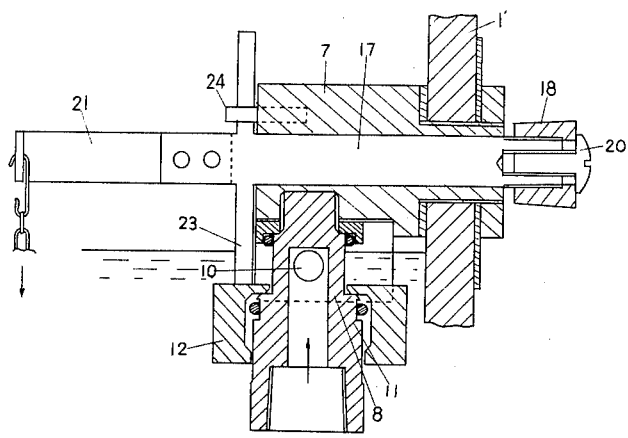
FIG. 4 is also similar to FIG. 2 but showing the valve in an open condition.
Figure 4:
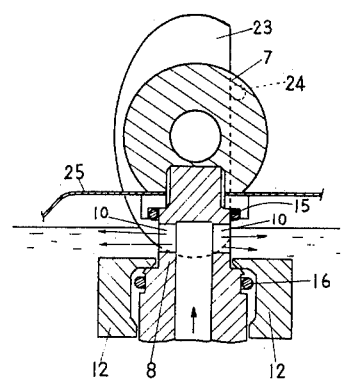

Then, if the operating lever 18 is again turned 90° for the purpose of discharging water, the valve cylinder 12 is pushed down by the cam element 23 to allow feed of water into the tank 1 from the water supply ports 10 as shown in FIGS. 4 (a) and (b), while the discharge valve 5 of the discharge valve assembly 3 is pulled by the chain 22 to an open position shown by phantom lines in FIG. 1, allowing discharge of water through discharge pipe 4 into the toilet bowl. If, at this time, the operating lever 18 is released, it returns to its original position in the manner said before, retaining the discharge valve 5 at its open position. When water in the tank 1 is almost entirely discharged, the discharge valve 5 returns to its closed position by its own weight and water is again supplied into the tank 1, and when the water level in the tank reaches a predetermined level, water supply ports 10 are closed by the valve cylinder 12 in the same way as described above.

Figure 5:
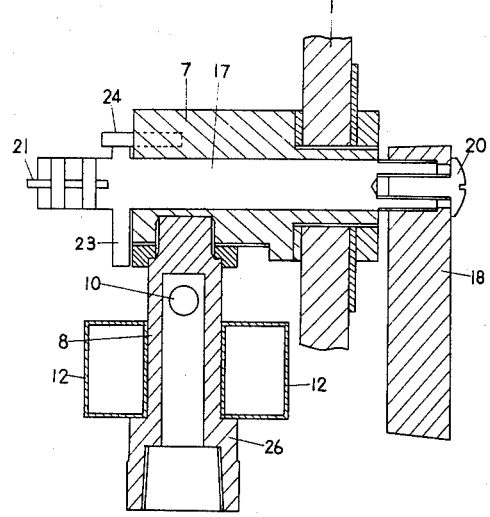
FIG. 5 is a schematic sectional view, with parts cut away, of the water tank of FIG. 1 where a stop valve according to another embodiment of the present invention is employed.

Referring now to FIG. 5, there is shown another embodiment of the present invention in which a hollow valve cylinder 12 is fitted movably up and down on a straight pipe-like water supply cylindrical valve body 8 so that substantially little space is formed between the valve body 8 and the valve cylinder 12, and a stopper flange 26 is provided at the lower end of said valve body 8. According to this arrangement, even if the water level in the tank 1 fluctuates somewhat with respect to the prescribed level, the valve cylinder 12 also moves up or down accordingly so that water is supplied to always maintain the prescribed level. If the valve cylinder 12 is fitted in the valve body 8 with substantially little spaced therebetween, it could happen that the valve cylinder 12 will not move down due to deposition of dust or other causes even when the water level lowers, but no such fear is present in the valve of the present invention because the valve cylinder 12 is positively lowered by the cam element 23 when the operating lever 18 is turned. Also, upward movement of the valve cylinder 12 can be ensured by making it from a material or with a shape that provides high buoyancy. Although the present invention has been described in a form adapted for water supply to a flush toilet, it will be apparent that the valve of the present invention can be equally applied to other uses.

As described above, according to the present invention, a valve body connected to a water supply pipe is disposed at an upper position in a tank, with one or more water supply openings being formed in the side wall of said valve body, and a valve cylinder adapted to close said water supply openings by its floating movement is mounted around said valve body so as to be movable up and down, so that when the water level in the tank reaches a predetermined level, the water supply is automatically shut off by said valve cylinder which floats up to its water supply port closing position. The valve of the present invention also includes a handle lever secured to the external end of a revolvable shaft passed through the tank side wall to effect opening of closing of the water discharge valve device at the tank bottom by operation of said handle lever, and a cam element mounted on said shaft so as to push the valve cylinder down in accordance with turning motion of said shaft, so that when water is discharged by operating said handle lever, said valve cylinder is positively lowered to supply water into the tank from the water supply ports, thus allowing automatic restoration of the prescribed water level in the tank immediately after completion of each water discharge from the tank. Further, this valve is very simple in structure as described above and allows automatic water supply to the prescribed level with no need of using any ball tap required in the conventional systems, whereby the valve itself is minimized as regards trouble or failure and can be manufactured at low cost. Also, as no ball tap is necessitated, the tank can be reduced to the minimum required size.

What we claim is:

1. An automatic stop valve comprising a hollow valve body mounted on a liquid supply pipe in a container to be supplied with pressurized liquid, said valve body having at least one liquid supply port formed at one end of the body for receiving liquid from said supply pipe and at least one liquid discharge port in the vicinity of the other end of the body for discharge of liquid into the container, a valve cylinder loosely mounted on said valve body and floatable in water constituted to be movable axially upwards on the valve body as the level of the pressurized liquid supplied into the container rises, and a valve release means for opening the valve by pressing said valve cylinder downwardly, said valve body having a pair of axially spaced seal members secured on the periphery of the valve body, said liquid discharge port being positioned between said seal members, said valve cylinder contacting said seal members liquid-tightly at both axial ends when the liquid level reaches a predetermined level.

2. An automatic stop valve as set forth in claim 1 wherein said valve cylinder is a hollow body which is movable axially of said valve body with little space left between the valve cylinder and the valve body.

3. An automatic stop valve as set forth in claim 1 wherein said valve cylinder has a top opening and a bottom opening through which said valve cylinder engages said valve body, the top opening being of smaller area than the bottom opening.

4. An automatic stop valve as set forth in claim 1 wherein said pair of seal members consist of rubber rings.

5. An automatic stop valve as set forth in claim 1 wherein said valve release means comprises a lever operable externally of the container and a cam member angularly driven by said lever, said cam member being positioned to abut the top end surface of said valve cylinder to press the valve cylinder downwardly at the time of opening of the valve.

6. An automatic stop valve as set forth in claim 1 wherein said valve cylinder has a specific gravity less than water.

7. An automatic stop valve as set forth in claim 6 wherein said valve cylinder is made from a synthetic resin.

8. An automatic stop valve as set forth in claim 1 wherein said valve body has a stepped outer surface with said seal members mounted on different steps on said outer surface, said seal members being of different diameter.

9. An automatic stop valve as set forth in claim 9 wherein said valve cylinder has a top opening and a bottom opening through which said valve cylinder engages said valve body, the top opening being of smaller area than the bottom opening.

* * * * *

UNITED STATES PATENT AND TRADEMARK OFFICE
CERTIFICATE OF CORRECTION

PATENT NO. : 4,079,748
DATED      : March 21, 1978
INVENTOR(S) : Eiji MASUDA

It is certified that error appears in the above-identified patent and that said Letters Patent are hereby corrected as shown below:

After line 5        insert:   -- Claims priority, application

Japan, September 13, 1975, 50-126177         ----.

Signed and Sealed this

Seventeenth Day of October 1978

[SEAL]

Attest:

RUTH C. MASON
Attesting Officer

DONALD W. BANNER
Commissioner of Patents and Trademarks